United States Patent
Kwak et al.

(10) Patent No.: US 9,607,518 B2
(45) Date of Patent: Mar. 28, 2017

(54) VEHICLE ACCIDENT RECORDER AND METHOD FOR GENERATING ACCIDENT INFORMATION THEREOF

(71) Applicant: HYUNDAI MOTOR COMPANY, Seoul (KR)

(72) Inventors: Hyo Geun Kwak, Daegu (KR); Dong Youl Lee, Gyeonggi-do (KR); Young Su Kim, Gyeonggi-do (KR); Chul Min Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/931,578

(22) Filed: Nov. 3, 2015

(65) Prior Publication Data
US 2016/0364986 A1 Dec. 15, 2016

(30) Foreign Application Priority Data
Jun. 9, 2015 (KR) .................. 10-2015-0081327

(51) Int. Cl.
G08G 1/00 (2006.01)
G08G 1/16 (2006.01)
B60Q 11/00 (2006.01)
G07C 1/00 (2006.01)

(52) U.S. Cl.
CPC ............ G08G 1/162 (2013.01); B60Q 11/00 (2013.01); G07C 1/00 (2013.01)

(58) Field of Classification Search
CPC .................................. G07C 1/00; B60R 1/00
See application file for complete search history.

(56) References Cited

U.S. PATENT DOCUMENTS

| | | | | |
|---|---|---|---|---|
| 2005/0060069 A1* | 3/2005 | Breed | .................. | B60N 2/2863 701/408 |
| 2013/0036236 A1* | 2/2013 | Morales | ................ | H04L 67/104 709/238 |
| 2015/0029308 A1* | 1/2015 | Han | ...................... | G08G 1/0112 348/43 |
| 2016/0247538 A1* | 8/2016 | Chuang | .................. | G11B 27/10 |

FOREIGN PATENT DOCUMENTS

| | | |
|---|---|---|
| JP | 2010-020386 A | 1/2010 |
| KR | 10-0925785 B | 11/2009 |
| KR | 10-2011-0088012 | 8/2011 |
| KR | 10-2012-0080960 | 7/2012 |
| KR | 10-2013-0108928 A | 10/2013 |
| KR | 10-2014-0022680 | 2/2014 |
| KR | 2014-0077630 A | 6/2014 |
| KR | 10-2014-0126852 | 11/2014 |

\* cited by examiner

*Primary Examiner* — Shirley Lu
(74) *Attorney, Agent, or Firm* — Brinks Gilson & Lione

(57) ABSTRACT

Disclosed herein are vehicle accident recorders and methods for generating accident information thereof. A method may include receiving an accident message transmitted from an accident vehicle; confirming a distance between a vehicle and an accident point and whether or not a view confirming the accident point is secured, based on accident data included in the accident message; and generating witness data for the accident point depending on results of the confirming of the distance between the vehicle and the accident point and whether or not the view is secured.

18 Claims, 6 Drawing Sheets

| TIME | POSITION | HEADING | PORTION | DISTANCE | ... |
|------|----------|---------|---------|----------|-----|

FIG.2A

| TIME | POSITION | HEADING | SPEED OF VEHICLE | H/W Sepc. | FORWARD IMAGE | BACKWARD IMAGE |
|------|----------|---------|------------------|-----------|---------------|----------------|

FIG.2B

VEHICLE ACCIDENT RECORDER AND METHOD FOR GENERATING ACCIDENT INFORMATION THEREOF

CROSS-REFERENCE TO RELATED APPLICATION

This application is based on and claims the benefit of priority to Korean Patent Application No. 10-2015-0081327, filed on Jun. 9, 2015 in the Korean Intellectual Property Office, the disclosure of which is incorporated herein in its entirety by reference.

TECHNICAL FIELD

The present disclosure relates to vehicle accident recorders in which a vehicle witnessing a vehicle accident among vehicles receives witness data as a broadcast message transmitted by an accident vehicle when the vehicle accident generates accident related data, and methods for generating accident information thereof.

BACKGROUND

As black boxes have become more available in vehicles, black boxes are more regularly utilized as evidence when a vehicle accident occurs. However, there is a limit to accurately determining circumstances of the accident just by the black box installed in a vehicle. In this case, if black box images of vehicles witnessing the accident around the scene of the accident are present, or infrastructures such as a closed-circuit television (CCTV) screen installed therearound, and the like are used, an accident situation may be more objectively analyzed and a cause of the accident may be perceived.

Thus, data for reproducing the accident situation may be collected by a method in which a vehicle broadcasts a message informing the accident to surrounding vehicles and infrastructures, and the vehicles and infrastructures receiving the message transmit data in which an accident surrounding situation is recorded to a server, in the case in which the vehicle senses the accident.

However, in the case in which all of the vehicles receiving the message transmit the data, since data which is not associated with the accident may be collected, storage of the server and network channels are wasted. Further, as data to be analyzed is increased, this increased data may become an obstacle to an accident analysis. Therefore, a need exists for an economical data transmission method for refining and transmitting only data which is associated directly with the accident among a variety of surrounding data.

SUMMARY

The present disclosure has been made to address the above-mentioned problems occurring in the prior art while still maintaining the advantages that the prior art achieved.

An aspect of the present disclosure provides a vehicle accident recorder in which a vehicle witnessing a vehicle accident among vehicles receiving a broadcast message transmitted by an accident vehicle in the case of the vehicle accident is configured to generate accident related data as witness data, and a method for generating accident information thereof.

According to an exemplary form of the present disclosure, a method for generating accident information of an vehicle accident recorder includes: receiving an accident message transmitted from an accident vehicle; confirming a distance between a vehicle and an accident point and whether or not a view confirming the accident point is secured, based on accident data included in the accident message; and generating witness data for the accident point depending on results of the confirming of the distance between the vehicle and the accident point and whether or not the view is secured.

The accident data may include an accident time and an accident position.

The accident data may further include a movement direction of the accident vehicle, crash information of the accident vehicle, a request distance of the witness data, altitude, a recent driving trajectory, speed immediately before an accident, and position accuracy.

The confirming of the distance between the vehicle and the accident point and whether or not the view is secured may include confirming a position of the accident point by parsing the accident message; operating distance data between the accident point and the vehicle; confirming whether the distance data is not more than a reference distance; and when the distance data is not more than the reference distance, confirming whether or not the view of the accident point is secured.

In the operating of the distance data, the distance data may be operated by using a Haversine operation.

In the operating of the distance data, a request distance of the witness data included in the accident data and the distance data may be operated by reflecting satellite accuracy.

The confirming of whether or not the view of the accident point is secured may include confirming whether the accident vehicle and the vehicle are positioned on the same road; operating an altitude difference of the accident vehicle and the vehicle; when the accident vehicle and the vehicle are positioned on the same road, confirming whether or not the vehicle obtains image data of the accident point; and when the image data of the accident point is obtained, generating the witness data.

The confirming of whether or not the accident vehicle and the vehicle are positioned on the same road may include operating the altitude difference of the accident vehicle and the vehicle; and confirming whether the altitude difference is less than tolerance.

In the confirming of whether or not the image data of the accident point is obtained, a driving path, a movement direction and steering angle information of the vehicle may be pieced together to confirm whether the accident point is positioned within a view range of the vehicle.

The witness data may include a data acquisition time, a data acquisition position, a movement direction of a data acquisition vehicle, and image data.

The witness data may further include speed and an image device specification of the data acquisition vehicle.

According to another exemplary form of the present disclosure, a vehicle accident recorder includes: a communicator configured to receive an accident message broadcasted from an accident vehicle; a vehicle information collector configured to collect vehicle data; and a controller configured to confirm a distance between a vehicle and an accident point and whether or not a view is secured based on accident data included in the accident message received through the communicator and generate witness data for the accident point.

The controller may be configured to process distance data between the accident point and the vehicle based on the accident data and configured to confirm whether the vehicle is positioned within a reference distance from the accident point.

The controller may reflect satellite accuracy at the time of operating the distance data.

The controller may be configured to process an altitude difference of the accident point and the vehicle and configured to confirm whether the accident point and the vehicle are positioned on the same road.

When the accident point and the vehicle are positioned on the same road, the controller may be configured to confirm whether the vehicle obtains image data of the accident point.

The controller may be configured to piece together a driving path, a movement direction, and steering angle information of the vehicle and be configured to confirm whether the accident point is positioned within a view range of the vehicle.

BRIEF DESCRIPTION OF THE DRAWINGS

The above and other objects, features and advantages of the present disclosure will be more apparent from the following detailed description taken in conjunction with the accompanying drawings.

FIG. 2A is a diagram illustrating a configuration of accident data.

FIG. 2B is a diagram illustrating a configuration of witness data.

DETAILED DESCRIPTION

Hereinafter, exemplary forms of the present disclosure will be described with reference to the accompanying drawings.

The present disclosure relates to a technology of efficiently transmitting witness data to reproduce an accident situation of a vehicle using the witness data of vehicles witnessing a vehicle accident.

Figure 1:
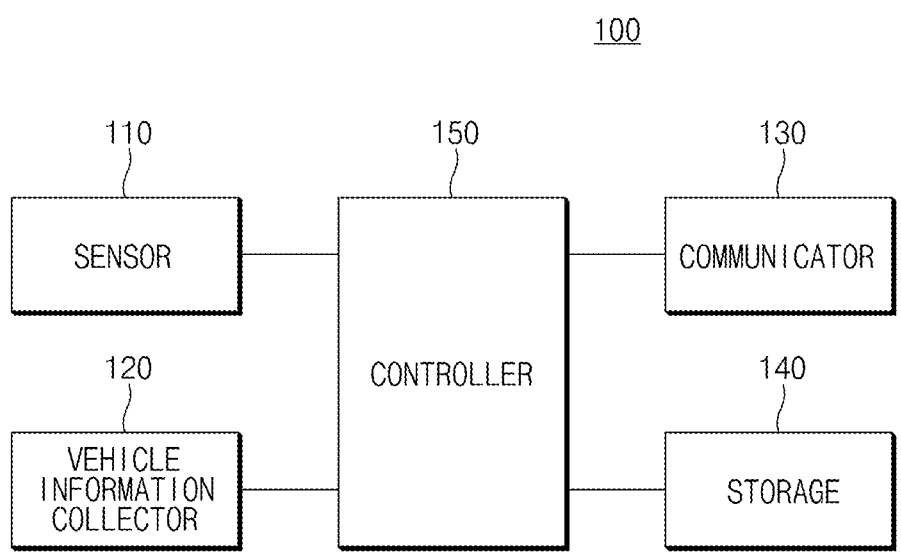
FIG. 1 is a block configuration diagram of a vehicle accident recorder.

FIG. 1 is a block configuration diagram of a vehicle accident recorder, FIG. 2A is a diagram illustrating a configuration of accident data, and FIG. 2B is a diagram illustrating a configuration of witness data.

Vehicle accident recorders 100 are mounted in an accident vehicle and witness objects. The witness objects are referred to as witness vehicles and infrastructures (e.g., CCTV, a security camera, etc.), and the like which are located around an accident point at which a vehicle accident occurs.

When the vehicle accident occurs, the vehicle accident recorder 100 collects information associated with the accident and generates an accident message. In addition, the vehicle accident recorder 100 broadcasts the generated accident message to surrounding vehicles and infrastructures.

In addition, when the vehicle accident recorder 100 receives the broadcasted accident message, the vehicle accident recorder 100 analyzes accident information included in the accident message to confirm a distance up to an accident point and a view of the accident point and then generates witness data to be transmitted to a server (not illustrated). Here, the server (not illustrated) collects accident related data transmitted from the vehicle accident recorders (100). In addition, the server (not illustrated) analyzes the collected data, and pieces together and processes data associated with the corresponding accident to be provided to the accident vehicle.

The vehicle accident recorder 100 includes a sensor 110, a vehicle information collector 120, a communicator 130, a storage 140, and a controller 150.

The sensor 110 senses an occurrence of the vehicle accident using a sensor. For example, the sensor 110 senses the occurrence of the vehicle accident in the case in which impact of a threshold value or more is sensed by an impact sensor.

The vehicle information collector 120 collects vehicle data using a variety of sensors and electronic control units. The vehicle information collector 120 may collect the vehicle data using various sensors such as a black box, a forward camera, a backward camera, a lateral camera, a speed sensor, a global positioning system (GPS) module, and the like. The vehicle data includes a model, vehicle speed, a position, a specification of an electronic image device, image data, and the like. The vehicle data is used to generate accident data or witness data.

The communicator 130 performs data communication with the surrounding vehicles and/or the infrastructures. The communicator 130 may use a wireless communication technology such as Vehicle to Vehicle (V2V), Vehicle to infra (V2I), Bluetooth, local area communication, or the like.

The storage 140 stores the vehicle data collected by the vehicle information collector 120. In addition, the storage 140 includes a program (software) for controlling an operation of the vehicle accident recorder 100. The storage 140 may also store data generated according to the operation of the vehicle accident recorder 100.

The storage 140 may include one or more types of storage medium of a flash memory type of memory, a hard disk type of memory, a multimedia card micro type of memory, a card type of memory (e.g., an SD or XD memory, or the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk.

The controller 150 controls an operation of each of the above-mentioned components.

When the sensor 110 senses the occurrence of the vehicle accident, the controller 150 collects the accident related data and generates the accident message. The controller 150 transmits the accident message generated by the communicator 130 to the surrounding vehicles and infrastructures, and the server. In this case, the controller 150 transmits unique accident identifier (ID) together with the accident message.

The accident message is configured of a header, a payload, and a check sum. The accident data is input to the payload of the accident message. As illustrated in FIG. 2A, the accident data includes a time field, a position field, a heading field, a portion field, a distance field, and the like. The time field stores an accident time, the position field stores an accident occurrence position (latitude and longitude), the heading field stores a movement direction of the accident vehicle, the portion field stores a portion at which impact occurs on the basis of a vehicle body of the accident vehicle, the distance field stores a radius within which the witness data is to be requested, from the accident point (an absolute distance+a distance compensation according to satellite accuracy), and other fields store altitude, satellite accuracy, a recent driving trajectory, speed immediately before the accident, and the like.

As such, the accident data includes the accident time, the accident position (latitude and longitude), the movement direction of the accident vehicle, crash information, a request distance of the witness data, and the like. Here, the request distance of the witness data is calculated by reflecting the satellite accuracy to the absolute distance from a vehicle to the accident point. For example, when the request distance of the witness data is calculated, in the case in which the absolute distance from the vehicle to the accident point is 50 m and the satellite accuracy is 10%, the request distance of the witness data is the radius of 55 m (=50 m×(1+0.1)).

The controller 150 determines whether accident image data needs to be transmitted by considering a receiving rate of global navigation satellite system (GNSS) using national marine electronics associations (NMEA) information.

The NMEA information includes global positioning system fix data (GGA) information including a time, a position, fix related data, etc., information (GPS satellites in view: GSV) of all of the satellites which may be currently received by the GPS module, and recommended minimum data (RMC) information.

The GGA information includes a GNSS scheme, the number of usable satellites, horizontal dilution of precision (HDOP), differential GPS (DGPS) data age, and DGPS base station ID.

The GSV information includes the number of satellites which are viewed at a current position, a satellite number, altitude, azimuth, and signal to noise ratio (SNR).

RMC information includes universal time coordinated (UTC) and GNSS reliability.

The controller 150 may calculate accuracy for a corresponding position signal using the NMEA information. Thereby, a distance between the accident vehicle and the vehicle receiving the accident message, and a distance to which position accuracy is reflected may be calculated. In addition, the controller 150 may use the calculated distance information to determine whether the accident image data needs to be transmitted.

When the controller 150 receives the accident message through the communicator 130, the controller 150 re-calculates the request distance of the witness data by reflecting position accuracy of the vehicle. For example, if the request radius included in the received accident message is 55 m and the position accuracy of the vehicle is 20%, the re-calculated request radius is 66 m (=55 m×(1+0.2)).

In addition, the controller 150 calculates a distance (D) between the accident point and the vehicle using longitude and latitude. Here, the controller 150 performs the calculation by using a Haversine operation.

If the distance between the accident point and the vehicle is shorter than the request distance of the witness data, the controller 150 generates the witness data and transmits the witness data to the server (not illustrated). For example, the controller 150 confirms whether the vehicle is positioned within a radius of 66 m from the accident point.

The controller 150 confirms whether the vehicle secures a view in which the accident point may be confirmed. In other words, the controller 150 confirms whether the vehicle may acquire image data of the accident point.

To this end, the controller 150 confirms whether the accident vehicle and the vehicle are on the same road by confirming altitude. In other words, the controller 150 confirms whether an altitude difference between the accident vehicle and the witness object (e.g., the witness vehicle) is less than a tolerance, using altitude information included in the NMEA information.

In addition, the controller 150 confirms whether an image of the accident point may be acquired by confirming a recent driving path and a movement direction (heading).

If the vehicle is positioned within a reference distance from the accident point and the image data of the accident point may be acquired, the controller 150 generates the witness data using the vehicle data collected by the vehicle information collector 120.

As illustrated in FIG. 2B, the witness data includes a time field, a position field, a heading field, a vehicle speed field, a device specification (H/W Spec) field, and an image data field. The time field stores a data acquisition time, the position field stores a data acquisition position (longitude and latitude), the heading field stores a movement direction of a data acquisition vehicle, the vehicle speed field stores speed of the data acquisition vehicle, the device specification field stores hardware information (e.g., a viewing angle, maximum resolution, the number of frames per second) of an image device (a camera), an image acquired by the image device, and the like.

Figure 3:
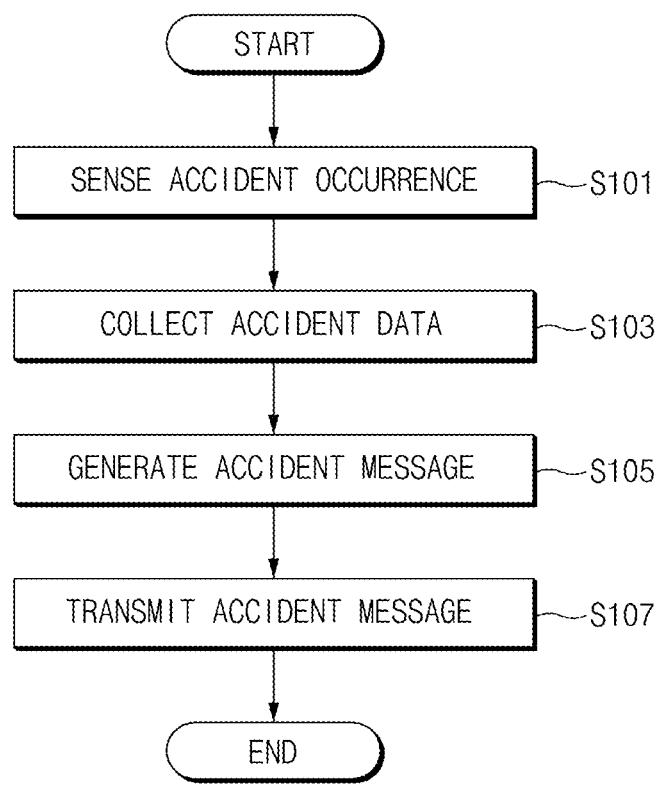
FIG. 3 is a flowchart illustrating a process of transmitting an accident message by an accident vehicle.

FIG. 3 is a flowchart illustrating a process of transmitting an accident message by an accident vehicle.

The vehicle accident recorder 100 of the accident vehicle senses an accident occurrence through the sensor 110 (S101).

If the accident occurrence is sensed, the vehicle accident recorder 100 collects the accident data using the vehicle information collector 120 (S103). The accident data includes an accident time, an accident position (latitude and longitude), a movement direction of the accident vehicle, crash information, a request distance of the witness data, and the like.

The vehicle accident recorder 100 generates the accident message using the collected accident data (S105). The accident message includes accident ID and the accident data.

The vehicle accident recorder 100 transmits the generated accident message to surrounding vehicles and infrastructures, and a server (not illustrated) (S107). That is, the vehicle accident recorder 100 of the accident vehicle broadcasts the accident message informing the accident occurrence. In addition, the server (not illustrated) analyzes the received data, pieces together data associated with the vehicle accident, and provides accident information to the accident vehicle.

Figure 4:
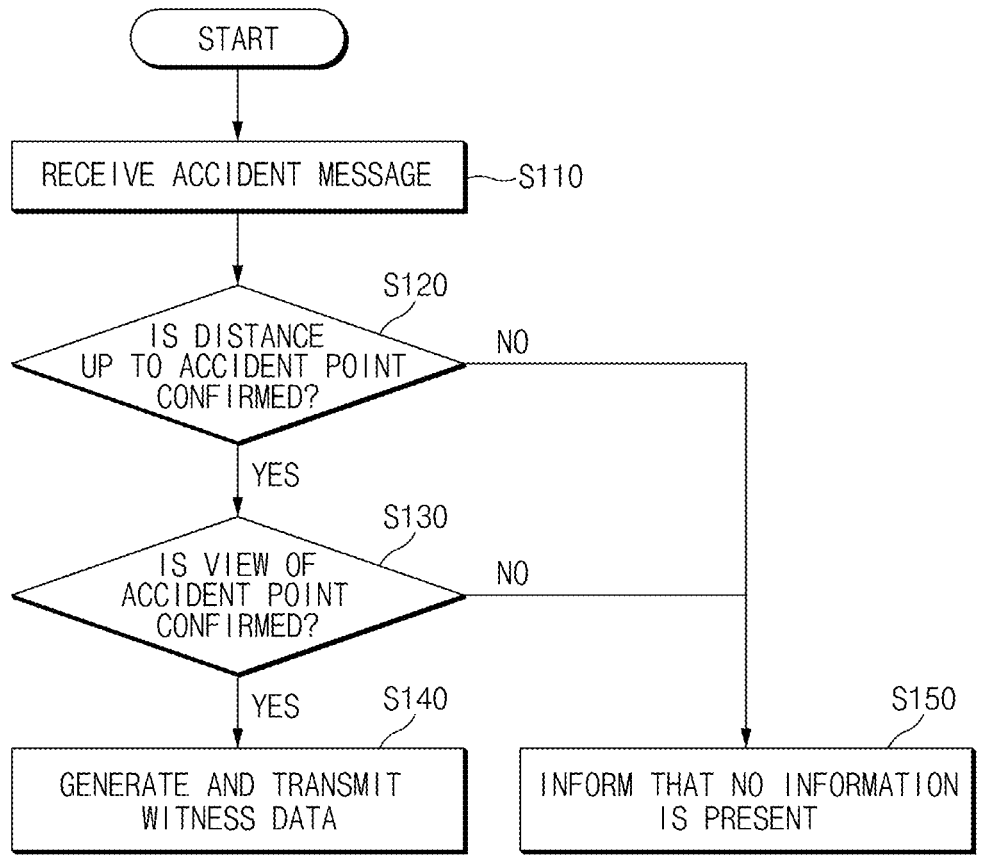
FIG. 4 is a flowchart illustrating a method for generating accident information from a vehicle accident recorder.

FIG. 4 is a flowchart illustrating a method for generating accident information from a vehicle accident recorder. In the present exemplary form, the object witnessing the vehicle accident transmits the witness data associated with the corresponding accident, and the case in which the witness object is a vehicle will be described by way of example.

Referring to FIG. 4, the vehicle accident recorder 100 of the witness vehicle receives the accident message transmitted from the accident vehicle through the communicator 130 (S110). In this case, the vehicle accident recorder 100 of the witness vehicle is driven in a message reception standby state.

The controller 150 of the vehicle accident recorder 100 confirms a distance from the vehicle to the accident point based on the accident data included in the accident message (S120). That is, the controller 150 confirms whether the vehicle is positioned within the request distance of the witness data included in the accident data from the accident point.

If the vehicle is positioned within the request distance from the accident point, the controller 150 confirms whether the accident point is in a view (S130). In other words, the controller 150 determines whether the vehicle may obtain image data of the accident point.

If the accident point is in the view of the vehicle, the controller 150 generates and transmits the witness data (S140).

Meanwhile, if a distance to the accident point is more than the request distance of the witness data or the accident point is out of a view of the vehicle, the controller 150 transmits a message informing no information (S150).

Figure 5:
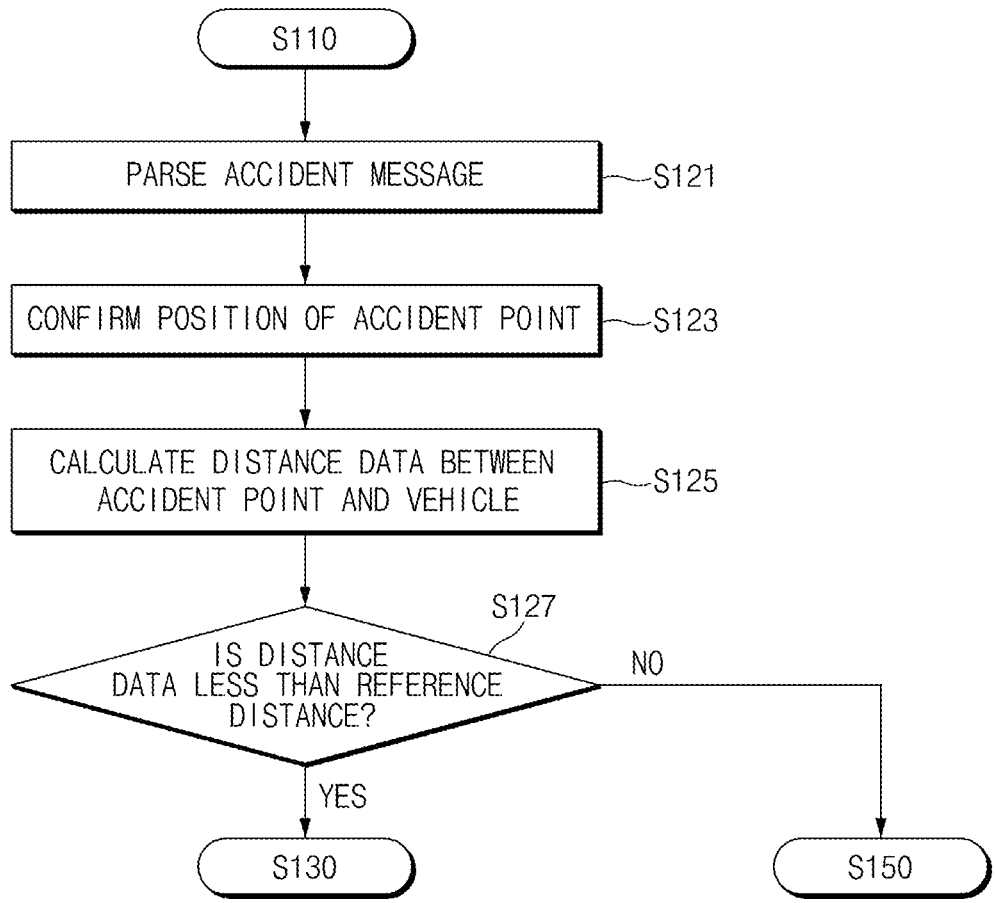
FIG. 5 is a flowchart illustrating a process of confirming a distance up to an accident point illustrated in FIG. 4.

FIG. 5 is a flowchart illustrating a process of confirming a distance up to an accident point illustrated in FIG. 4.

First, the controller 150 parses the accident message received through the communicator 130 (S121).

The controller 150 confirms a position of the accident point (accident position) based on the accident data included in the parsed accident message (S123).

The controller 150 calculates distance data between the vehicle and the accident point (S125). In this case, the controller 150 calculates the reference distance (request distance of the witness data) by confirming satellite accuracy and reflecting the confirmed satellite accuracy. That is, the controller 150 re-calculates the request distance of the witness data by reflecting the satellite accuracy to the request distance of the witness data stored in the distance field of the accident message.

The controller 150 confirms whether the calculated distance data is not more than the reference distance (S127). In other words, the controller 150 confirms whether the vehicle is positioned within the request distance of the witness data re-calculated based on the accident point.

If the calculated distance data is not more than the reference distance, the controller 150 performs an operation (S130). Meanwhile, if the calculated distance data exceeds the reference distance, the controller 150 performs an operation (S150).

Figure 6:
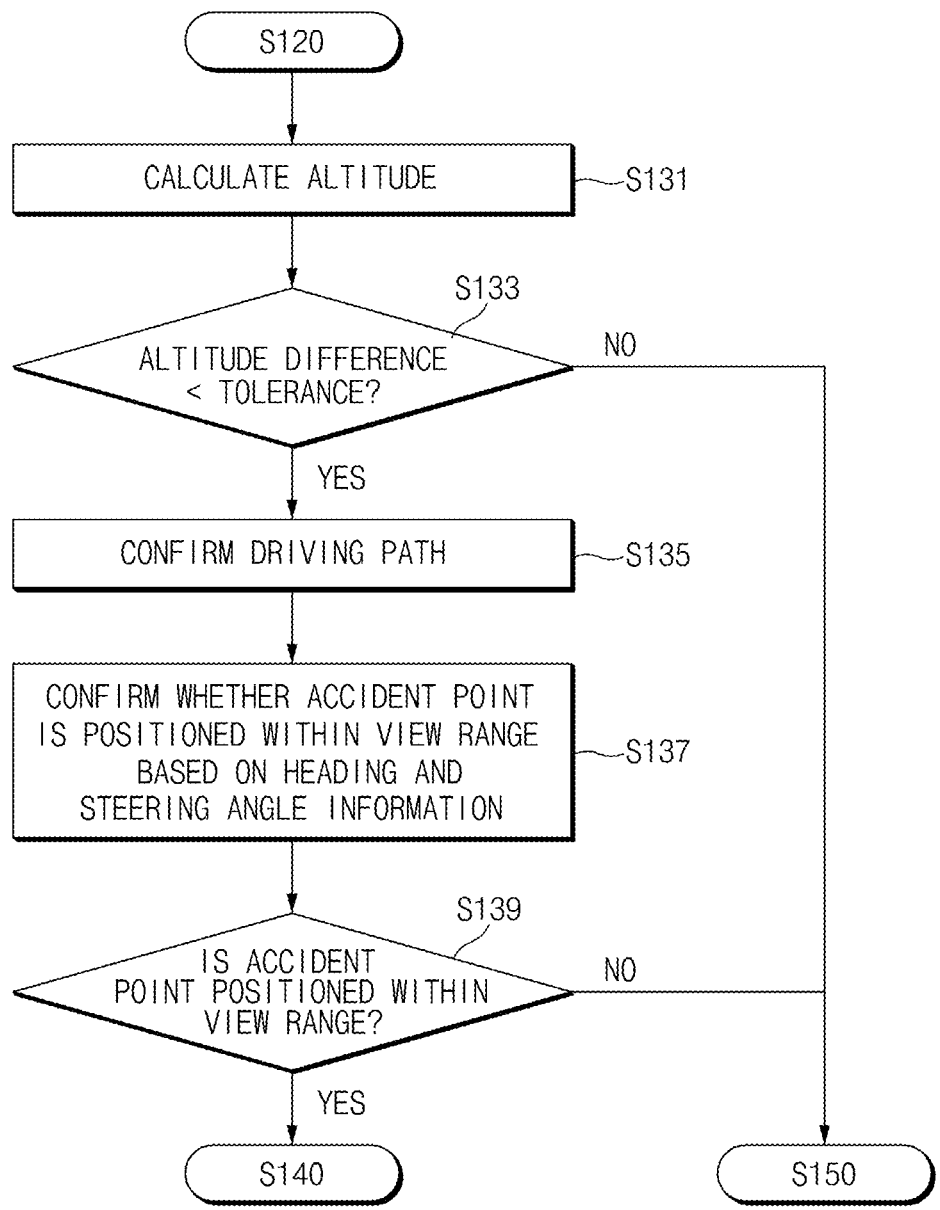
FIG. 6 is a flowchart illustrating a process of confirming a view of the accident point illustrated in FIG. 4.

FIG. 6 is a flowchart illustrating a process of confirming a view of the accident point illustrated in FIG. 4.

The controller 150 calculates altitudes of the accident vehicle (accident point) and the vehicle (witness vehicle) (S131). The controller 150 confirms the altitude of the accident vehicle using altitude information included in the accident message and confirms the altitude of the vehicle based on GPS information obtained by the GPS module of the vehicle. In addition, the controller 150 calculates an altitude difference of the accident vehicle and the vehicle.

The controller 150 confirms whether the altitude difference is less than tolerance (S133). The controller 150 confirms whether the accident vehicle and the vehicle are positioned on the same road using the altitude information.

If the altitude difference is less than the tolerance, the controller 150 confirms a driving path of the vehicle (S135). The controller 150 may confirm a movement direction of the vehicle by confirming the driving path of the vehicle. Meanwhile, if the altitude difference exceeds the tolerance, the controller 150 performs the operation (S150).

Next, the controller 150 confirms whether the accident point is positioned within a view range of the vehicle based on the movement direction and steering angle information of the vehicle (S137) In other words, the controller 150 confirms whether the vehicle may acquire image data of the accident point.

If the accident point is positioned within the view range of the vehicle, the controller 150 performs the operation (S140), and if the accident point is out of the view range of the vehicle, the controller 150 performs the operation (S150). In other words, if the image data of the accident point may be acquired, the controller 150 generates the witness data and transmits the witness data to the server (not illustrated). Meanwhile, if the image data of the accident point may not be acquired, the controller 150 informs the server (not illustrated) that no information is to be provided.

As described above, according to exemplary forms of the present disclosure, since the vehicle receiving the broadcast message transmitted by the accident vehicle in the case of the vehicle accident generates only the data associated with the corresponding accident as the witness data, the data may be rapidly and accurately analyzed.

In addition, in forms of the present disclosure, system resources such as the storage of the server and the network channels may be saved, and the data may be rapidly and accurately analyzed.

Although the exemplary forms of the present disclosure have been disclosed for illustrative purposes, those skilled in the art will appreciate that various modifications, additions and substitutions are possible, without departing from the scope and spirit of the present disclosure as disclosed in the accompanying claims. Accordingly, such modifications, additions and substitutions should also be understood to fall within the scope of the present disclosure.

What is claimed is:

1. A method for generating accident information of an vehicle accident recorder, the method comprising:
   receiving, with a communicator of the vehicle accident recorder, an accident message transmitted from an accident vehicle;
   confirming, with a controller of the vehicle accident recorder, a distance between a vehicle and an accident point, based on accident data included in the accident message;
   confirming, with the controller, whether a view of the accident point is secured, based on the distance between the vehicle and the accident point;
   confirming, with the controller, whether the vehicle is able to acquire image data of the accident point based on an altitude difference between the accident vehicle and the vehicle included in the accident message; and
   generating, with the controller, witness data for the accident point depending on confirmation of whether the view of the accident point is secured and confirmation of whether the vehicle is able to acquire image data of the accident point.

2. The method according to claim 1, wherein the accident data includes an accident time and an accident position.

3. The method according to claim 2, wherein the accident data further includes a movement direction of the accident vehicle and crash information of the accident vehicle.

4. The method according to claim 3, wherein the accident data further includes a request distance of the witness data, altitude, a recent driving trajectory, speed immediately before an accident, and position accuracy.

5. The method according to claim 1, wherein confirming the distance between the vehicle and the accident point comprises:
   confirming a position of the accident point by parsing the accident message;
   processing distance data between the accident point and the vehicle;
   confirming whether the distance data is not more than a reference distance; and when the distance data is not more than the reference distance, confirming the view of the accident point is secured.

6. The method according to claim 5, wherein the distance data is processed using a Harversine operation.

7. The method according to claim 5, wherein processing the distance data comprises processing a request distance of the witness data included in the accident data and the distance data by reflecting satellite accuracy.

8. The method according to claim 5, wherein confirming whether the view of the accident point is secured includes,
confirming whether the accident vehicle and the vehicle are positioned on the same road;
processing an altitude difference of the accident vehicle and the vehicle;
when the accident vehicle and the vehicle are positioned on the same road, confirming whether the vehicle obtains image data of the accident point; and
when the image data of the accident point is obtained, generating the witness data.

9. The method according to claim 8, wherein confirming whether the accident vehicle and the vehicle are positioned on the same road includes,
operating the altitude difference of the accident vehicle and the vehicle; and
confirming whether the altitude difference is less than tolerance.

10. The method according to claim 8, wherein in confirming whether the image data of the accident point is obtained,
a driving path, a movement direction and steering angle information of the vehicle are pieced together to confirm whether the accident point is positioned within a view range of the vehicle.

11. The method according to claim 8, wherein the witness data includes a data acquisition time, a data acquisition position, a movement direction of a data acquisition vehicle, and image data.

12. The method according to claim 11, wherein the witness data further includes speed and an image device specification of the data acquisition vehicle.

13. A vehicle accident recorder comprising:
a communicator configured to receive an accident message broadcasted from an accident vehicle;
a vehicle information collector configured to collect vehicle data; and
a controller configured to:
confirm a distance between a vehicle and an accident point, based on accident data included in the accident message received through the communicator;
confirm whether a view is secured based on the distance between the vehicle and the accident point;
confirm whether the vehicle is able to acquire image data of the accident point based on an altitude difference between the accident vehicle and the vehicle included in the accident message; and
generate witness data for the accident point depending on confirmation of whether the view of the accident point is secured and confirmation of whether the vehicle is able to acquire image data of the accident point.

14. The vehicle accident recorder according to claim 13, wherein the controller is configured to process distance data between the accident point and the vehicle based on the accident data and configured to confirm whether the vehicle is positioned within a reference distance from the accident point.

15. The vehicle accident recorder according to claim 14, wherein the controller is configured to reflect satellite accuracy at the time of processing the distance data.

16. The vehicle accident recorder according to claim 13, wherein the controller is configured to process an altitude difference of the accident point and the vehicle and configured to confirm whether the accident point and the vehicle are positioned on the same road based on the altitude difference.

17. The vehicle accident recorder according to claim 16, wherein when the accident point and the vehicle are positioned on the same road, the controller is configured to confirm whether the vehicle obtains image data of the accident point.

18. The vehicle accident recorder according to claim 17, wherein the controller is configured to piece together a driving path, a movement direction, and steering angle information of the vehicle and configured to confirm whether the accident point is positioned within a view range of the vehicle.

* * * * *